United States Patent [19]

Wolf

[11] 4,375,609

[45] Mar. 1, 1983

[54] ANALOG/DIGITAL DRIVE SPEED CONTROL CIRCUIT

[75] Inventor: Robert F. Wolf, Waukesha, Wis.

[73] Assignee: Abex Corporation, New York, N.Y.

[21] Appl. No.: 242,809

[22] Filed: Mar. 11, 1981

[51] Int. Cl.³ .............................................. H02P 5/06
[52] U.S. Cl. ..................................... 318/312; 318/317
[58] Field of Search ............... 318/310, 311, 312, 315, 318/317, 400

[56] References Cited

U.S. PATENT DOCUMENTS

| 3,629,633 | 12/1971 | O'Callaghan | 318/317 X |
| 3,953,776 | 4/1976 | Wolf | 318/312 |
| 4,129,810 | 12/1978 | Harshberger, Jr. | 318/317 |
| 4,280,082 | 7/1981 | Acharya et al. | 318/310 X |

Primary Examiner—J. V. Truhe
Assistant Examiner—W. E. Duncanson, Jr.
Attorney, Agent, or Firm—Thomas S. Baker, Jr.; David A. Greenlee

[57] ABSTRACT

A speed control circuit has a comparator which compares a voltage signal which is indicative of the actual speed of a shaft with a digital reference which is indicative of the desired speed of the shaft. If the actual speed is different than the desired shaft speed, a bi-directional control mechanism is operated in one direction or the other to adjust the actual speed of the shaft. The operation of the bi-directional control mechanism is periodically interrupted to increment the amount the actual shaft speed is changed to prevent overshoot of the desired speed.

10 Claims, 1 Drawing Figure

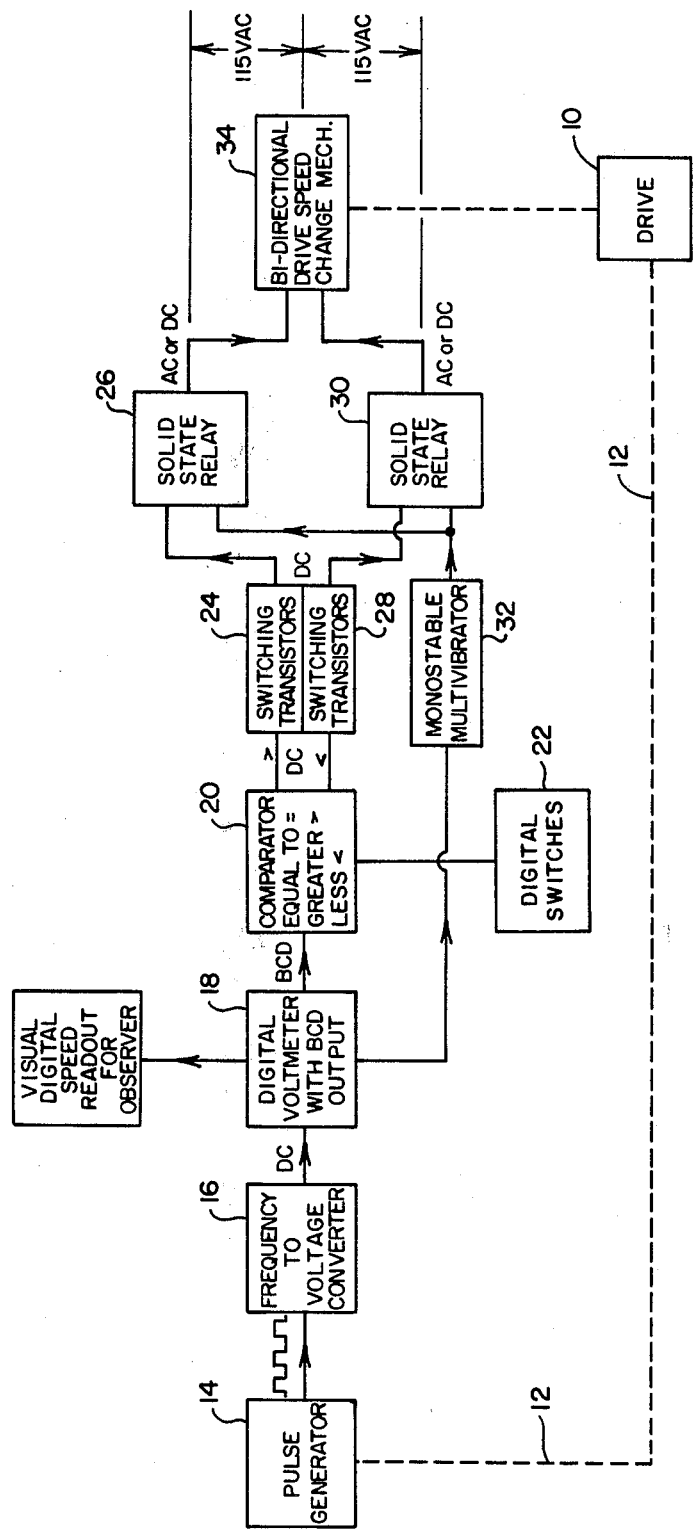

ANALOG/DIGITAL DRIVE SPEED CONTROL CIRCUIT

BACKGROUND OF THE INVENTION

This invention relates to a circuit which controls a speed changing device.

An example of a prior circuit which controls the speed of a motor is shown in applicant's U.S. Pat. No. 3,953,776, which is assigned to the assignee of the instant invention. In the prior circuit, the speed of a motor is measured during a first fixed time interval. During this interval it is determined whether the motor is running fast or slow in comparison to a preset speed. If the motor is running faster or slower than the preset speed, its speed is corrected during a second fixed time interval which immediately follows the first time interval. Under some circumstances, as when the motor speed is quite slow, the first time interval must be relatively long, which means it takes a relatively long time to correct the speed of a slow running motor. It is desirable to have a speed control circuit which has a fast response time.

It is also desirable to have a control system in which the reference speed, or the desired speed, of a device can be set manually by a digital reference or automatically by an input from a control process or a computer.

Another problem with prior speed control circuits is that when a change is made in an attempt to bring the speed of the device closer to that of a preset reference the change causes the device to overshoot the reference speed. This is because most speed change actuators have significant inertia which prevents the cut-off of their speed change effect when the desired speed is reached. This causes the device to continually hunt for the reference speed.

In the instant invention the signal which operates a speed changing device is pulsed to allow the device to coast to the reference speed. In other words, the duration of the time of operation of the speed changing device is such that the speed of the device is changed in small increments until the reference speed is reached. This significantly eliminates overshoot of the reference speed and hunting by the device.

SUMMARY OF THE INVENTION

The instant invention relates to a circuit for controlling the speed of a device which has a rotatable shaft. A voltage signal which is proportional to the rotational speed of the shaft is generated and supplied to the input of a digital voltmeter having a binary coded decimal output. The output of the digital voltmeter is supplied to a comparator. The comparator examines the voltage signal and compares it with a reference. If the shaft speed is less than the reference speed, a signal is supplied to the less than output terminal of the comparator and a speed change mechanism is actuated to increase the speed of the device. If the speed of the device is greater than the reference speed, a signal is supplied to the greater than output terminal of the comparator and the speed change mechanism is actuated to decrease the speed of the device. An interrupter in the circuit limits the length of time the speed change mechanism operates. This time can be varied. In this way the speed of the device is changed in increments which are sized so that the device does not overshoot the reference speed.

DESCRIPTION OF THE DRAWINGS

The drawing is a block diagram of the analog/digital drive speed control circuit of the instant invention.

DESCRIPTION OF THE PREFERRED EMBODIMENT

A variable speed device 10, which may be a variable pitch belt drive, a variable frequency or voltage motor drive, a hydraulic drive, or a motor driven pump, has a shaft 12 which is to rotate at a preset or reference speed. A pulse generator 14, which in the instant invention produces a 5-volt positive, square wave pulse, is coupled to shaft 12. Pulses from the generator 14 are fed to the input of a frequency-to-voltage converter 16 which is also known as an analog-to-digital converter. The output of the frequency-to-voltage converter 16 is a DC voltage. This voltage is calibrated to be directly proportional to the rotational speed of shaft 12. In the instant circuit, the converter 16 is calibrated such that an output of 0.100 volts represents a shaft speed of 100 rpm. The calibration can be accomplished by means of a self-contained calibration adjustment on the converter 16, as in the instant invention, or by the use of an external potentiometer.

The calibrated DC voltage output of converter 16 is fed into a digital voltmeter 18 which may also be a digital panel meter. In the instant invention the digital voltmeter 18 has a visual digital speed readout. It is also necessary for the digital voltmeter 18 to have a binary coded decimal output format. In the instant invention the digital voltmeter 18 is constructed of complementary metal oxide components and has a logic one or high of approximately 4–15 volts and a logic zero or low of approximately 0.7–2 volts.

The binary coded decimal output of digital voltmeter 18 is input to one set of a plurality of inputs of a digital comparator 20. The comparator 20 is made up of a number of comparator chips, which number corresponds to the number of digits required to handle the speed range of the shaft 12. As an example, a speed of 200 rpm requires a 3-chip comparator, whereas a speed of 2000 rpm requires a 4-chip comparator. A set of digital switches 22 having a binary coded decimal output format are set by an operator to the desired rotational speed of shaft 12. The binary coded decimal output of the switches 12 is supplied to the inputs of comparator 20 and provides a reference or preset speed. Although a digital switch reference signal from switches 22 is shown on the drawing, the reference signal could also be provided by any other process, monitoring system or control instrument which has a binary coded decimal output. As an example, a pressure sensor having a BCD output could be calibrated to reference a specific speed to a desired rate of flow. Also, if the process monitoring or control system has only a voltage or current output, this output can be converted to BCD by a digital voltmeter with a BCD output format.

The comparator 20 has three output stages which relate to the comparison of the binary coded decimal signal received from digital voltmeter 18 with the binary coded decimal output provided by the digital switches 22. The three output stages are greater than, equal to or less than. When the output of digital voltmeter 18 is greater than the output of the digital switches 22, which indicates the shaft 12 is rotating faster than the reference speed, the greater than output of comparator 20 is enabled or made high. When the output of the digital voltmeter 18 is equal to the output of the digital switches 22, which indicates the shaft 12 is rotating at the reference speed, the equal to output terminal of comparator 20 is enabled. When the output of digital voltmeter 18 is less than the output of the digital switches 22, which indicates the shaft 12 is rotating slower than the reference speed, the less than output terminal of comparator 20 is enabled.

The greater than output of comparator 20 is input to a switching transistor 24 which raises the power level of the output and is then supplied to a negative control terminal of a solid state relay 26. The less than output of comparator 20 is input to a switching transistor 28 which raises the level of the output and is then supplied to a negative control terminal of a solid state relay 30. Although the output signals from comparator 20 are positive, these signals are inverted to the negative state by the switching transistors 24, 28.

Digital voltmeter 18 has a periodic negative command signal which is supplied to a monostable multivibrator 32. The negative command signal causes the monostable multivibrator 32 to periodically produce a positive going pulse which is supplied to each of the positive input terminals of the solid state relays 26, 30.

Since the solid state relays 26, 30 are two input terminal devices, a relay 26, 30 is enabled when a positive signal from comparator 20 and a negative command from digital voltmeter 18 are supplied to the negative and positive input terminals of the relay simultaneously. In the instant invention, solid state relay 26 is connected to the slow-down winding of an electric motor 34 and the slow-down winding is energized when the relay 26 is enabled. Of course, solid state relay 26 could also energize some other type of bidirectional speed change device. Solid state relay 30 is connected to the speed-up winding of motor 34 and the speed-up winding is energized when relay 30 is enabled. Motor 34 is, of course, connected to the device 10.

The length of time the solid state relays 26, 30 are enabled to energize the slow-down or speed-up windings of motor 34 is determined by the output of monostable multivibrator 32. The time duration of the output of multivibrator 32 is adjusted by means of external resistance and capacitance components in a well-known manner. The duration of the output of the period of monostable multivibrator 32 is adjusted for optimum performance of the drive control circuit. Optimum performance is defined as fastest slewing of the drive to the desired speed with minimum overshoot of the desired speed. It should be noted that the use of the combination of a command signal from the digital voltmeter 18 to trigger the monostable multivibrator 32 automatically synchronizes the enabling of the output of the solid state relays 26, 30 to the updated timing of the voltmeter 18.

Operation of the analog/digital drive speed control circuit is as follows. The output of comparator 20 is a function of the measured speed of shaft 12 as indicated and outputted by digital voltmeter 18 as compared to the reference speed set by digital switches 22. If the measured speed is less than the reference speed, the less than output terminals of comparator 20 are actuated or made high which causes solid state relay 30 to be enabled which, in turn, energizes the speed-up windings of motor 34. The length of time the relay 30 is enabled and the speed-up windings are energized is determined by the duration of the output of multivibrator 32. This time is set for an optimum condition of fastest slewing and minimum overshoot. If the measured speed of shaft 12 is greater than the reference speed, the greater than output terminals of comparator 20 are actuated or made high which enables solid state relay 26 and energizes the slow-down windings of motor 34. The length of time solid state relay 26 is enabled and the slow-down windings are energized is again determined by the duration of the output of multivibrator 32.

It should be noted that time pulse modification of relays 26, 30 can be achieved by means other than a monostable multivibrator 32. For example, a solid state timer such as a D-555 type timer can be used to modulate the energizing of the solid state relays 26, 30, or a so-called flasher type relay can be used to interrupt the output of the solid state relays to the windings of the motor 34. If a flasher is used between the relays 26, 30 and the windings of motor 34, relays 26, 30 would be used in a single input mode of operation in which their positive input terminals are connected together and to the positive side of the supply voltage.

| LIST OF COMPONENTS DESCRIPTION | MFG | MODEL NO. |
| --- | --- | --- |
| Pulse Generator | Airpax Controls Div. | 4000-1 |
| Frequency-to-Voltage Converter | D-B Developments Co. | 22A-1KHZ |
| Digital Panel Meter | Meterex Corporation | MX 2578 |
| Solid State Relays | Theta J Corporation | OFA 1205 D |
| Monostable Multivibrator | Fairchild Corporation | FuA556* Connected as a Multivibrator |
| Switching Transistors | IDI Corporation | 2N3706 |
| Digital Switches | Durant Digital Instrument Co. | 49903-400 |
| Drive | Reliance Electric Co. | Reeves "Moto" Drive with ERC |

*An equivalent is the Teledyne Model D-555

Although a preferred embodiment of the invention has been illustrated and described, it will be apparent to those skilled in the art that various modifications may be made without departing from the spirit and scope of the present invention.

What is claimed is:

1. A speed control circuit comprising a device having a rotatable shaft,
   means for generating a voltage signal which is proportional to the rotational speed of the shaft,
   a digital voltmeter having a binary coded decimal output,
   means for supplying the voltage signal to the digital voltmeter,
   a digital comparator having a greater than output signal and a less than output signal,
   means for supplying the output of the digital voltmeter to the digital comparator,
   means for generating a reference which indicates a desired shaft speed,
   means for supplying the reference to the digital comparator,
   a bi-directional control mechanism for changing the speed of the shaft,
   first means for operating the bi-directional control mechanism in one direction to cause the speed of the shaft to increase, second means for operating the bi-directional control mechanism in the other direction to cause the speed of the shaft to decrease, first means for connecting the comparator greater than output signal to the second operating means, second means for connecting the comparator less than output signal to the first operating means, wherein the comparator examines the voltage signal with respect to the reference and the greater than output signal is actuated to cause the second operating means to decrease the speed of the shaft when the voltage signal indicates the shaft speed is greater than the desired speed and the less than output signal is actuated to cause the first operating means to increase the speed of the shaft when the voltage signal indicates the shaft speed is less than the desired speed, and means for disabling the first and second operating means to thereby limit the time of operation of the first and second operating means.

2. The speed control circuit of claim 1, wherein the first operating means includes a first switching transistor and a first relay and the second operating means includes a second switching transistor and a second relay.

3. The speed control circuit of claim 1, wherein the disabling means includes an adjustable circuit interrupter.

4. The speed control circuit of claim 2, including means for connecting the disabling means between the digital voltmeter and the first and second relays.

5. The speed control circuit of claim 4, wherein the disabling means includes a monostable multivibrator.

6. The speed control circuit of claim 4, wherein the digital voltmeter includes a command signal which enables the first and second operating means.

7. The speed control circuit of claim 6, wherein the period of the command signal is adjustable.

8. The speed control circuit of claim 1, wherein the reference may be a preset digital input which indicates a desired shaft speed.

9. The speed control circuit of claim 1, wherein the voltage signal generating means includes a pulse generator which generates electrical pulses at a frequency which is proportional to the rotational speed of the shaft and an analog-to-digital converter which produces a direct current voltage proportional to the number of electrical pulses it receives.

10. The speed control circuit of claim 1, wherein the reference may be a process monitoring or control system which has a BCD output format.

* * * * *

UNITED STATES PATENT OFFICE
CERTIFICATE OF CORRECTION

PATENT NO. : 4,375,609
DATED : March 1, 1983
INVENTOR(S) : Robert F. Wolf

It is certified that error appears in the above-identified patent and that said Letters Patent are hereby corrected as shown below:

Col. 4, line 10 - "modification" should read --modulation--

Signed and Sealed this

Twenty-sixth Day of April 1983

[SEAL]

Attest:

GERALD J. MOSSINGHOFF

Attesting Officer      Commissioner of Patents and Trademarks